C. E. ETNIER.
TURBINE.
APPLICATION FILED MAR. 30, 1906.
921,529.
Patented May 11, 1909.
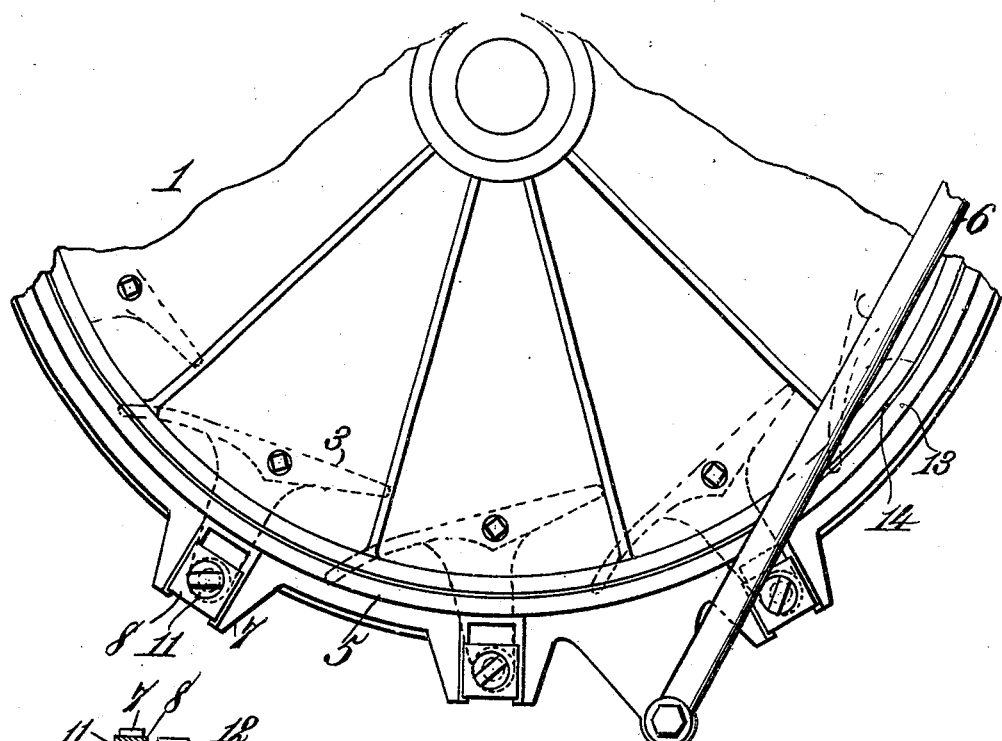
Witnesses
Inventor
Carey E. Etnier
By James L. Norris
Atty.

UNITED STATES PATENT OFFICE.

CAREY E. ETNIER, OF YORK, PENNSYLVANIA.

TURBINE.

No. 921,529.      Specification of Letters Patent.      Patented May 11, 1909.

Application filed March 30, 1906. Serial No. 308,966.

*To all whom it may concern:*

Be it known that I, CAREY E. ETNIER, a citizen of the United States, residing at York, in the county of York and State of Pennsylvania, have invented new and useful Improvements in Turbines, of which the following is a specification.

This invention relates to a turbine or water wheel and particularly to a connecting organization between the gates and a rotatable member or element for operating the gates.

This invention is an improvement on the structure disclosed by Patent No. 809,147 granted to Charles E. Smith, January 2, 1906.

The primary object of the present invention is to ease off the connection between the gates of a turbine and a rotatable member for opening and closing the said gates to obviate wear or loose movement of the connecting organization, and to absorb vibration that in analogous constructions now in use is transmitted back to the operating mechanism, and particularly to the governors, with material disadvantage.

The improved gate mechanism is adapted to be operated by any motor mechanism, but in view of the arrangement of the connecting organization between the gates and member or means for operating the same, the gate mechanism is particularly constructed for actuation by governor motive means.

In the drawings: Figure 1 is an end elevation of a portion of a turbine embodying the features of the invention. Fig. 2 is a transverse section through a portion of the turbine particularly showing the invention. Fig. 3 shows a detail perspective view of the parts of the connecting organization particularly embodying the invention. Fig. 4 is a view similar to Fig. 2, illustrating a modification.

The numeral 1 designates a turbine having opening and closing gates 3 fulcrumed at an intermediate point and provided with arms 4, projecting outwardly therefrom, the said arms being connected to an actuating member or ring 5, provided with mechanism 6, for shifting the same in opposite rotary directions. This mechanism 6 may be of any preferred form, and may be operated by any suitable motive power, the present improvement particularly residing in the connection between the rotary member or ring 5 and the arms 4 of the gates and specially devised to adapt the turbine to be operated by governor motive power.

One form of the connection between the rotary member or ring 5 and the arms 4 of the gates 3, as particularly shown by Figs. 1 and 2, consists in constructing the said rotary member or ring 5 with a series of slotted ears or bosses 7, located at the periphery and having ease members or slide bushings 8 disposed therein and recessed at opposite ends, as at 9, to provide end bearing flanges 10 to embrace opposite portions of the ears or bosses 7 so as to give a positive bearing to the said ease members or slide bushings and reduce the wear thereon to a minimum. The ease members or slide bushings 8 have a slidable movement in the slotted ears or bosses 7, the latter and the said ease members or bushings being so proportioned as to compensate in all instances for the maximum operation of the rotary member or ring 5, without incurring any liability of jamming or displacing the said ease members or bushings. The ease members or bushings are formed with openings 10$^a$, one in each, and rotatably projecting thereinto is an eccentric extremity 11 of a connecting pin or bolt 12, which is secured at its opposite end in the free terminal of the gate arm. An obvious modification of this construction is shown by Fig. 4, and consists in disposing the several ease members or bushings in the outer terminals of the arms of the gates to receive the eccentrics 11 of the pins, the opposite extremities of the pins or bolts being secured in the periphery of the rotary member or ring 5.

In both forms of the device the operation is precisely similar, the eccentric extremity of the pin or bolt in each instance being of about the same diameter as the opening of the ease member or bushing into which it snugly projects. By shifting the rotary member or ring 5 in opposite directions, the pins change position in the ease members or bushings, but do not have the least binding action in view of the fact that the members or bushings will give, or move outwardly and inwardly in accordance with the direction of movement of the member or ring 5.

The eccentric construction of the pins or bolts in the ease members or bushings also facilitates the operation of the said ease members or bushings to compensate for the change of the position of the rotary member or ring, and of the arms of the gates. A further advantage in the arrangement of the pins in the openings of the ease members or bushings is that friction is reduced, and, moreover, any vibrations that in ordinary turbine constructions are transmitted back to the operating mechanism and instituted by movement of the water against the gates, are absorbed and will not in the least affect, in the present construction, the motor means or governors, or any other mechanism that may be arranged in coöperative relation to the turbine. A still further advantage is that in the event of structural irregularity or lack of true correspondence in all the gates, the latter may first be fully shut and the connection made to compensate for irregularity of the individual gates, so that in operating the gates they will all operate equally and similarly in opening and closing movements.

The ease members or bushings may be constructed of brass, bronze, or any other suitable material that will withstand the action of water, and which will resist wear to a material extent. Turbines now in use may be readily equipped with the improved connecting organization, and it will be understood that the several parts of the connecting organizations will always be proportionate to the dimensions of the rotary member or ring and the gates with which they operate.

By the use of the eccentric pin and the ease member set forth, the gates are operative with a considerably less number of pins or wearing parts, as compared with ordinary turbines, that are objectionable when placed in water carrying sand and grit which rapidly wear the said multiplicity of connections in turbines now in use, and the improved structure has the additional advantage of obtaining the greatest area possible for bearing surface on the pins and ease members or blocks.

To provide a snug fit for the ring or rotary member 5, the head of the turbine is formed with a flange 13 between which and the said ring or rotary member a wear strip 14, of suitable material, is introduced. The flange 13 forms a bearing support for the ring or rotary member 5 and insures a prevention of loose movement thereof and facilitates an effective operation of the connecting organization between the ring or rotary member and the gates through the medium of the ease members or blocks and the pins having the eccentrics 11 thereon.

The blocks or members 8 move outwardly and inwardly on their bearing surfaces when the gates are opened and closed, and said blocks are also at a distance from or exterior of the direct supporting means for the several gates, so that the pins and blocks may be readily accessible when it is desired to reset or replace the gates. Furthermore, the several blocks or members 8 which are preferably formed of brass, bronze, or other non-corrosive material, shield their bearing surfaces, owing to the flanged construction of each block or member, and, therefore, said bearing surfaces cannot become clogged with grit with material benefit in the operation of the several blocks or members. The slots formed between the ears or bosses 7 are entirely open at their outer extremities and sufficiently open at their inner extremities to permit any foreign matter to pass therethrough without becoming clogged or being jammed in the said slots, with a further advantage in the operation of the blocks or members 8, and particularly in preventing wear between the same and their bearing surfaces.

Having thus fully described the invention, what is claimed as new, is:

1. In a turbine, the combination with gates to control the open and closed condition of the blades thereof, of a rotary member coöperating with said gates and movable around the periphery of the turbine, the rotary member having a plurality of slots opening out through the outer edge thereof, and a connecting organization between the rotary member and gates and consisting of a series of inwardly and outwardly slidable ease members of the same number as the gates and located in said slots of the rotary member and having openings therethrough, and a corresponding series of pins having eccentric portions movably and snugly fitting in the openings of the ease members, each pin being immovably secured at one extremity, the connecting organization being located exteriorly of the portion of the turbine inclosing the gates.

2. In a turbine, the combination with a plurality of gates, of a rotary member operative to open and close the said gates provided with a plurality of slots extending transversely thereof and opening through the outer edge, the slots being the same in number as the number of gates, a series of slidable blocks or ease members engaging the slots and having grooves at opposite sides and openings extending through the centers thereof in planes at right angles to the grooves, and a plurality of pins having eccentric portions snugly and rotatably engaging the openings of the ease members or blocks, one pin engaging each block, and each pin having one extremity immovably secured, the slidable blocks or ease members and pins being located exteriorly of the gate inclosing and supporting portions of the turbine.

3. In a turbine, the combination with a supporting means and a set of gates, of a gate operating ring having a plurality of outwardly extending slotted ears or bosses, and connecting means between each of the gates and the said operating ring and including a pin having concentric and eccentric portions, and an ease member slidably mounted in the slotted ear or boss adjacent to each gate, the ease member having an opening therethrough and provided with side flanges to engage the walls of the slot of the ear or boss, the eccentric portion of the pin snugly and movably engaging the opening of the ease member and one extremity of the pin immovably secured, the several pins connecting portions of the gates to the ease members and both the pins and ease members being exteriorly accessible.

In testimony whereof I have hereunto set my hand in presence of two subscribing witnesses.

CAREY E. ETNIER.

Witnesses:
  CHAS. S. HYER,
  JAMES L. NORRIS.